(12) United States Patent
Shashank

(10) Patent No.: US 10,020,983 B2
(45) Date of Patent: Jul. 10, 2018

(54) REACHABILITY FAULT ISOLATION AND RECOVERY USING ASYNCHRONOUS NOTIFICATIONS

(71) Applicant: CA, Inc., New York, NY (US)

(72) Inventor: Kumar Shashank, Hyderabad (IN)

(73) Assignee: CA, Inc., New York, NY (US)

( * ) Notice: Subject to any disclaimer, the term of this patent is extended or adjusted under 35 U.S.C. 154(b) by 118 days.

(21) Appl. No.: 14/815,200

(22) Filed: Jul. 31, 2015

(65) Prior Publication Data

US 2017/0033974 A1 Feb. 2, 2017

(51) Int. Cl.
*H04L 12/24* (2006.01)
*H04L 12/26* (2006.01)

(52) U.S. Cl.
CPC ...... *H04L 41/0659* (2013.01); *H04L 41/0631* (2013.01); *H04L 41/0677* (2013.01); *H04L 41/12* (2013.01)

(58) Field of Classification Search
CPC ............. H04L 41/0659; H04L 41/0677; H04L 41/0686; H04L 43/045
See application file for complete search history.

(56) References Cited

U.S. PATENT DOCUMENTS

| 5,436,909 A | 7/1995 | Dev et al. |
| 7,296,194 B1 | 11/2007 | Lovy et al. |
| 7,912,459 B2 | 4/2011 | Houston et al. |
| 8,392,465 B2 | 3/2013 | Bojanic et al. |
| 2008/0016115 A1 | 1/2008 | Bahl et al. |
| 2010/0306594 A1* | 12/2010 | Pirozzi ............... H04L 43/0817 714/39 |
| 2012/0101800 A1 | 4/2012 | Miao et al. |
| 2014/0320500 A1* | 10/2014 | Fletcher .................. G09G 5/36 345/440 |
| 2016/0013990 A1* | 1/2016 | Kulkarni ................ H04L 41/22 709/224 |
| 2016/0072688 A1* | 3/2016 | Desai .................... H04L 41/065 709/224 |
| 2016/0371135 A1* | 12/2016 | Sarkar ................. G06F 11/079 |

* cited by examiner

*Primary Examiner* — Noel Beharry
*Assistant Examiner* — Nicole King

(57) ABSTRACT

A fault isolation system asynchronously builds a fault domain graph to identify fault domains to isolate a root cause of a problem in a computer network. Basically, when the fault isolation system receives a notification that an entity of the network is unreachable (i.e., in a down status), the fault isolation system requests neighbor lists and statuses for the neighbors to asynchronously build a fault domain graph. From that topology, the fault isolation system determines a root cause of the problem with the network.

20 Claims, 15 Drawing Sheets

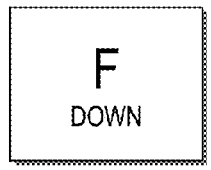 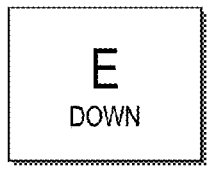 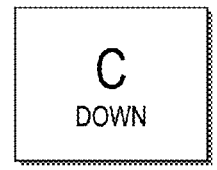
FIG. 7  FIG. 8  FIG. 9
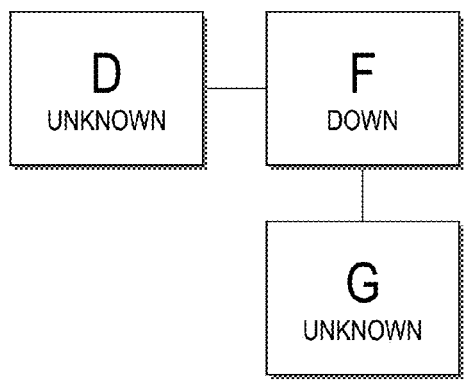 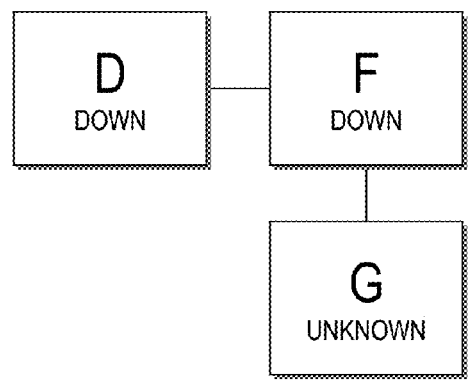
FIG. 10  FIG. 11

REACHABILITY FAULT ISOLATION AND RECOVERY USING ASYNCHRONOUS NOTIFICATIONS

BACKGROUND

Various aspects of the present disclosure relate generally to fault isolation in computer networks. Thus, the present disclosure advances an improvement in the technical field of computer network failure analysis.

A computer network is a group of entities such as routers, switches, etc. that are in communication with each other. A router is a networking entity that forwards data packets between networks or sub-networks within one network; usually routers couple to other routers or to switches. On the other hand, a switch routes data from a source (e.g., a router, a server) to one or more entities within the network.

In computer networks, a number of problems arise, including traffic overload on entities within the network, network faults, etc. If a problem does arise in the network where one or more of the entities are unreachable by other entities in the network, a network management system will try to identify the root cause of the problem so the problem may be fixed. Once the root cause is known, a network manager will try to recover from the problem.

BRIEF SUMMARY

According to aspects of the present disclosure, a method for a fault isolation system for determining a root cause of a problem in a network comprises receiving an electronic notification that an entity of the computer network includes a down status, wherein the notification signifies a problem with the network. A fault domain graph including the entity with the down status is created, and a neighbor list (which includes unique identifiers (i.e., names) of entities that are connected to the down entity) is asynchronously requested from a network management system. The neighbor list for the entity with the down status is received, and the fault domain graph is updated based on the received neighbor list. The following is performed until all entities in the fault domain include a known status and there is no pending request for a neighbor list or status: a status of entities of the fault domain graph whose statuses are unknown is requested and received asynchronously, a neighbor list for each entity in the fault domain that includes a down status and does not already have a neighbor list is requested and received asynchronously, and the fault domain is updated based on the received neighbor lists and statuses. Based on the fault domain, a root cause of the problem of the network is determined, and the root cause is published.

According to further aspects of the present disclosure, the method further includes receiving a second notification of a second entity in the network with a down status. The fault domain graph is searched for the second entity. If the second entity is not found in the fault domain graph, then a second fault domain graph is created, and a neighbor list, which includes unique identifiers (i.e., names) of entities that are connected to the second entity, is requested from the network management system, asynchronously from the first fault domain graph. The neighbor list for the second entity with the down status is received, and the second fault domain graph is updated based on the received neighbor list. The following is performed until all entities in the fault domain include a known status and there is no pending request for a neighbor list or status: a status of entities of the second fault domain graph whose statuses are unknown is requested and received asynchronously, a neighbor list for each entity in the second fault domain that includes a down status and does not already have a neighbor list is requested and received asynchronously, and the second fault domain is updated based on the received neighbor lists and statuses. If any entities from the first fault domain graph are coupled to entities in the second fault domain graph, then the first fault domain graph and the second fault domain graph are merged. Based on the merged fault domain graph, a root cause of the problem of the network is determined, and the root cause is published.

BRIEF DESCRIPTION OF THE SEVERAL VIEWS OF THE DRAWINGS

FIGS. 7-17 are block diagrams used in illustrating the example of building a fault domain and of a simple root cause analysis, according to various aspects of the present disclosure;

DETAILED DESCRIPTION

Overview

According to aspects of the present disclosure, if there is a problem in a network, a root cause of the problem may be found using asynchronous notifications about device status. In a network comprised of many heterogeneous devices, a device's status is reported to a fault isolation system. If the device's status is up and running, then everything is OK with that device, and things continue as normal within the network. However, if any device is down (i.e., not running or not responding to status requests), then the fault isolation system (coupled to a network management system) builds a fault domain graph on-the-fly, based on statuses and neighbor lists of the devices. However, the fault domain graph does not necessarily include every entity in the network, just the entities in a down status and entities in an up status that are coupled to the entities in a down status. This topology may then be easily navigated to determine the root cause of the problem with the network, even if there are multiple root causes of the problem.

Figure 1:
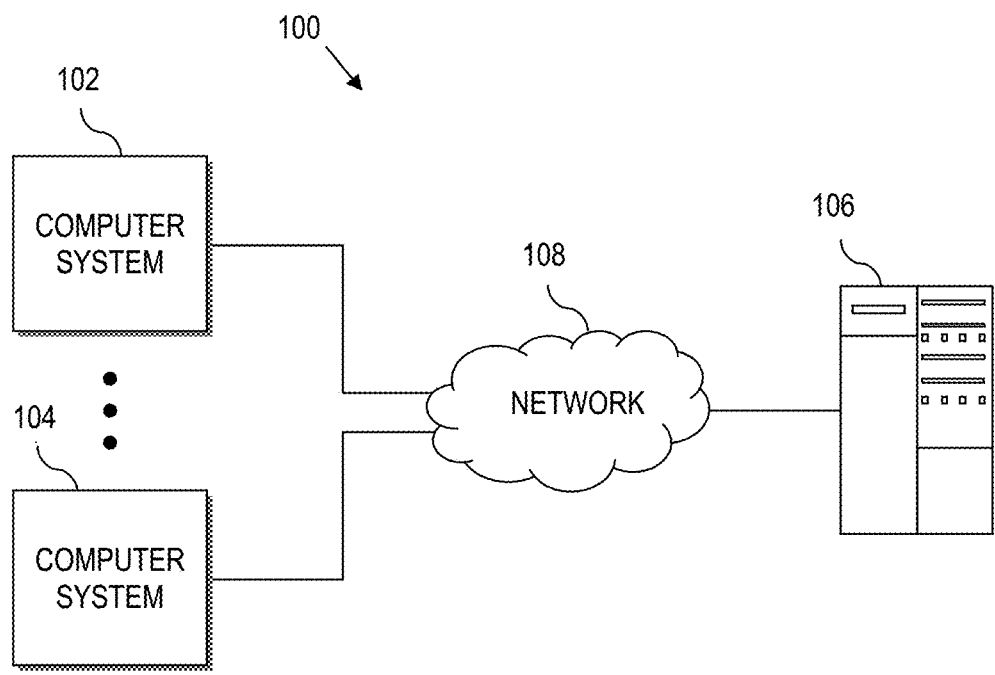
FIG. 1 is a block diagram of a sample computer network, according to various aspects of the present disclosure.

Referring to drawings and in particular FIG. 1, a network system 100 is illustrated according to aspects of the present disclosure herein. Generally, a processing device designated as a first machine 102 communicates with one or more remote processing devices, e.g., a second machine 104 and a third machine 106, across a network 108. The second machine 104 and third machine 106 are illustrated solely for purposes of simplified explanation. In practice, one or more remote devices may communicate with the first machine 102. The first machine 102 may comprise a mainframe computer, server computer, or other processing device that is capable of responding to data transfer requests, as will be described in greater detail herein. In this regard, the first machine 102 has access to storage 110, e.g., any form of storage, including disk(s), network addressed storage (NAS), file server(s), a cloud based storage or other structure where data can be retrieved.

The second machine 104 and third machine 106 may each comprise any processing device that is capable of communicating over the network 108 to request and/or receive data from the first machine 102. For instance, typical processing devices include server computers, personal computers, notebook computers, and tablets. The second machine 104 or third machine 106 may also comprise by way of example, transactional systems, purpose-driven appliances, cellular devices including smart telephones, and special purpose computing devices.

For purposes of discussion herein, the second machine 104 has access to storage 112 where data received from the first machine 102 is to be stored. Likewise, the third machine 106 has access to storage 114 where data received from the first machine 102 is to be stored.

The network 108 provides communication links between the various processing devices, e.g., the first machine 102, the second machine 104, and the third machine 106. Accordingly, the network 108 may be supported by networking components such as routers, switches, hubs, firewalls, network interfaces, wired or wireless communication links and corresponding interconnections, cellular stations and corresponding cellular conversion technologies, e.g., to convert between cellular and TCP/IP, etc. Such devices are not shown for purposes of clarity. Moreover, the network 108 may comprise connections using one or more intranets, extranets, local area networks (LAN), wide area networks (WAN), wireless networks (WIFI), the Internet, including the world wide web, a cloud, and/or other arrangements for enabling communication between the processing devices, in either real time or otherwise, e.g., via time shifting, batch processing, etc.

The network system 100 is shown by way of illustration, and not by way of limitation, as a computing environment in which various aspects of the present disclosure may be practiced. Other configurations may alternatively be implemented. All of the devices discussed above in reference to the network (e.g., machines, routers, switches, hubs, etc.) are entities within the network.

State Machine for Fault Isolation

Figure 2:
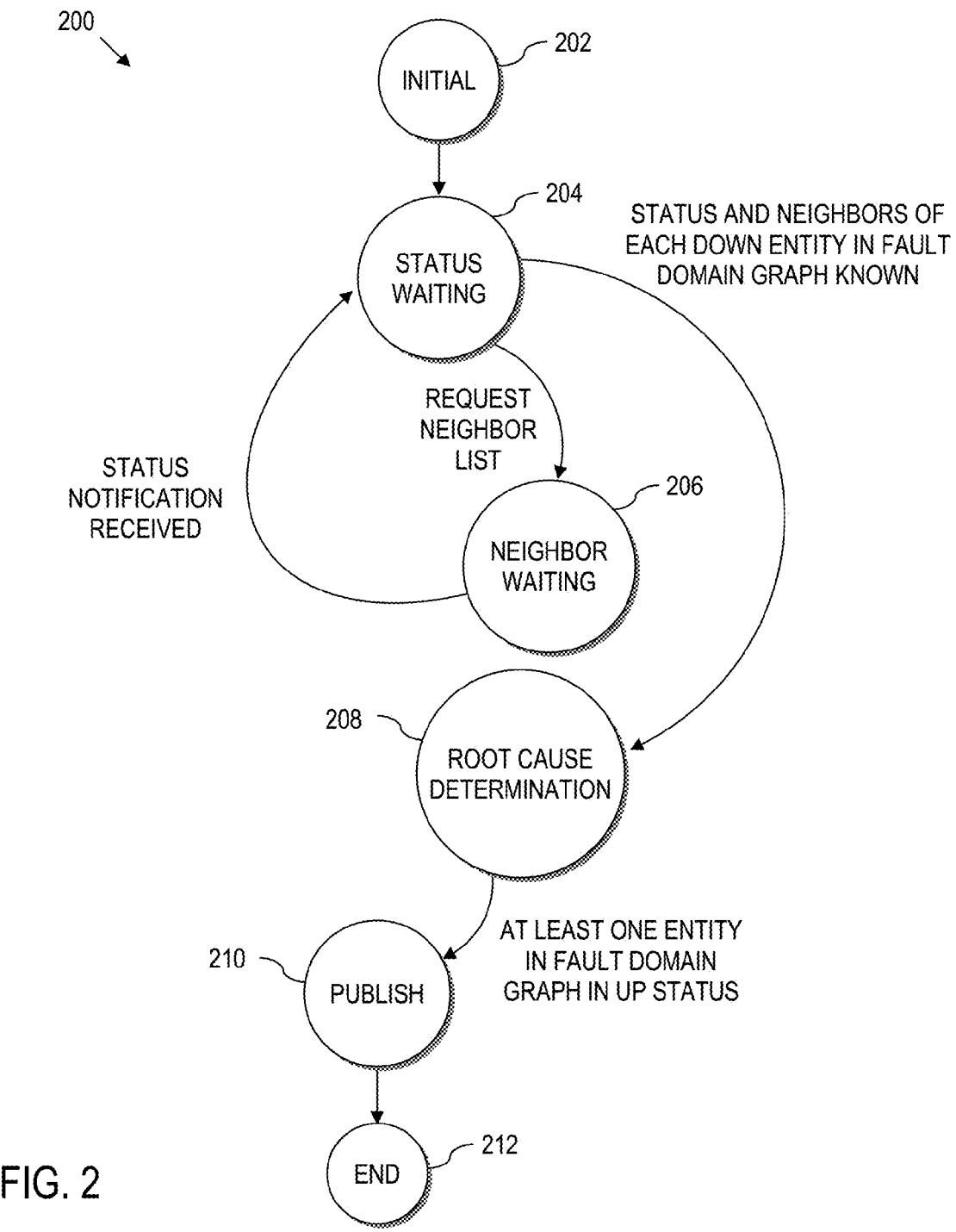
FIG. 2 is a diagram illustrating a state machine for isolating a root cause of a problem in a network, according to various aspects of the present disclosure.

Referring now to FIG. 2, a state machine 200 for isolating a root cause of a problem in a network using asynchronous notifications is presented. When a notification that an entity (e.g., client, server, router, switch, etc.) of a network system is in a down (i.e., unreachable) status, a fault isolation system determines if the entity is associated with a fault domain graph already in place. If not, then the fault isolation system may create a new fault domain graph and may instantiate a state machine 200 as part of the fault isolation system, where the state machine includes an initial state 202. The state machine 200 immediately transitions to a statusWaiting state 204, where a request for a neighbor list of the entity is sent. Then, the state machine 200 transitions to a neighborWaiting state 206, as it waits for the neighbor list.

When a new notification occurs, the fault isolation system determines if the new notification is a status update for an entity of the fault domain graph or a neighbor list of an entity of the fault domain graph. If the notification is a neighbor list, then the fault isolation system updates the fault domain graph with neighbors of the entity associated with the neighbor list. For example, if the fault domain graph includes one entity, Entity_A, and the neighbor list for Entity_A includes Entity_B and Entity_C, then the fault isolation system adds Entity_B and Entity_C to the fault domain graph and connects them to Entity_A. A request for statuses of any entities with unknown statuses is sent (e.g., Entity_B and Entity_C), and the state machine transitions to the statusWaiting state 204.

If the notification is a status notification, then the fault isolation system updates the status for the entities associated with the status notification. If there are any entities with a down status that are not associated with a neighbor list request, then the fault isolation system sends a request for the neighbor list for those entities and transitions to the neighborWaiting state 206.

Once all of the neighbor-list requests and all of the status requests have been resolved (i.e., each entity status is known and each down entity in the fault domain graph is connected to all of its neighbors), then the state machine transitions to a rootCauseDetermination state 208. Here, the fault isolation system determines which down entities in the fault domain graph are root cause entities and which of the down entities are merely symptomatic entities. If an entity of the fault domain graph is in the up status, then a root cause entity may be found; however, if all of the entities of the fault domain graph are down, then a root cause entity may not be identified. If a root cause entity is identified, then the state machine 200 transitions to a Publish state 210, where the root cause entities and the symptomatic entities are published to a user (e.g., a system administrator). For example, the root cause entities and the symptomatic entities may be displayed on a screen. If no root cause entity is found or after the root cause entities and symptomatic entities are published, the state machine 200 transitions to an End state 212.

Multiple state machines 200 may run concurrently. For example, if a first fault domain includes Entity_A, Entity_B, and Entity_C and a notification that Entity D is down is received, then a second state machine 200 may be instantiated within the fault isolation system to keep track of a second fault domain graph that includes Entity D.

If two or more fault domain graphs ever include the same entity, then the fault domain graphs are merged, and the state machines for the merged graphs are also merged to reflect the state machine for whichever fault domain graph is the least along in the process. For example, if a state machine in the rootCauseDetermination state 208, the Publish state 210, or the End state 212 is merged with a state machine in the statusWaiting state 204, then the merged state machine will be in the statusWaiting state 204. Similarly, if a state machine in the rootCauseDetermination state 208, the Publish state 210, or the End state 212 is merged with a state machine in the neighborWaiting state 206, then the merged state machine will be in the neighborWaiting state 206. However, if a state machine in the neighborWaiting state 206 is merged with a state machine in the statusWaiting state 204, then the merged state machine may be in either the neighborWaiting state 206 or the statusWaiting state 204, depending on a specific implementation of the state machine—the results overall should be identical.

Further, when two fault domain graphs are merged, the pending requests should be concatenated. In some embodiments when merging two fault domain graphs, any pending requests from one fault domain graph that have already been received on the other fault domain may be removed from the pending requests, although this is not required.

Methods for Fault Isolation

Figure 3:
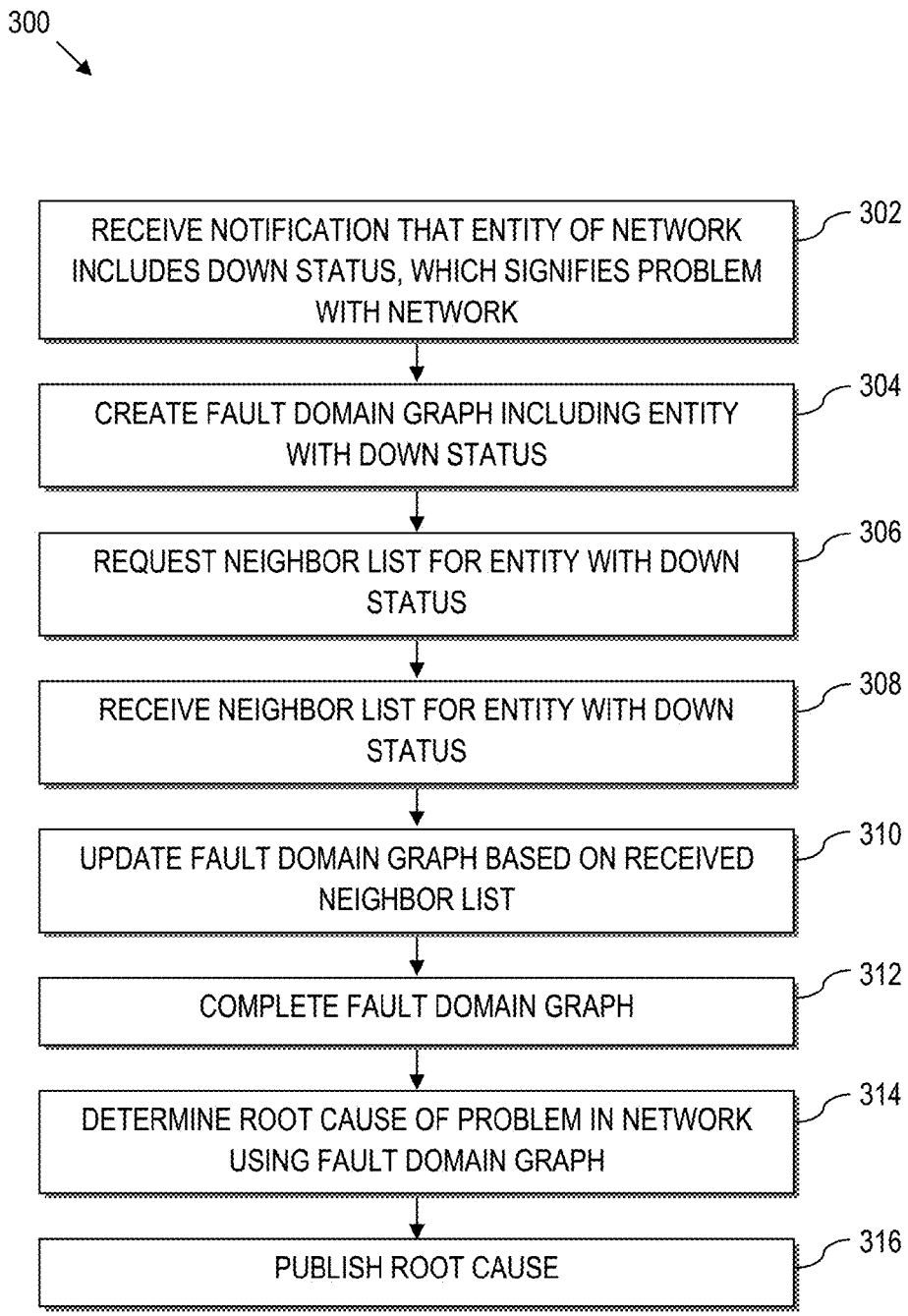
FIG. 3 is a flow chart illustrating a method for isolating a root cause of a problem in a network, according to various aspects of the present disclosure.

Referring now to FIG. 3, a method 300 for isolating a root cause of a problem in a network using asynchronous notifications is presented. In this regard, the method 300 may be implemented on computer-readable hardware that stores machine-executable program code, where the program code instructs a processor to implement the described method. The method 300 may also be executed by a processor coupled to memory, where the processor is programmed by program code stored in the memory, to perform the described method. The method may include running the state machine 200 described above in FIG. 2, and indications of which state the state machine is in within the method 300 are provided. However, the method 300 may be implemented in any practical way (i.e., without use of the state machine).

At 302, a fault isolation system receives a notification that an entity (e.g., client, server, router, switch, etc.) of a network system is in a down (i.e., unreachable) status, which signifies a problem with the network. The fault isolation system is in communication with a network management system that sends notifications concerning entities in down status to the fault isolation system. As such, the fault isolation system may be integrated with the network management system. Alternatively, the fault isolation system may be coupled to the network management system externally, which allows the fault isolation systems described herein to interact with existing network management systems.

At 304, when the notification is received, the fault isolation system determines if the entity is included in any existing fault domain graph. If not, then the fault isolation system creates a fault domain graph including the entity with the down status and may instantiate the state machine described above in reference to FIG. 2 for the fault domain graph, and the state machine transitions to the statusWaiting state. At this point, the fault domain graph includes only one entity.

At 306, the fault isolation system requests a neighbor list for the entity with the down status, and the state machine will move to the neighborWaiting state. For example, the fault isolation system may send a request to the network management system for a list of all entities that are coupled to the down entity. The network management system knows the topology of the network, so the network management system sends the neighbor list to the fault isolation system, and at 308, the fault isolation system receives the neighbor list. At 310, the fault isolation system updates the fault domain graph with the neighbor list by adding any entities that are neighbors of the entity with the down status.

Figure 4:
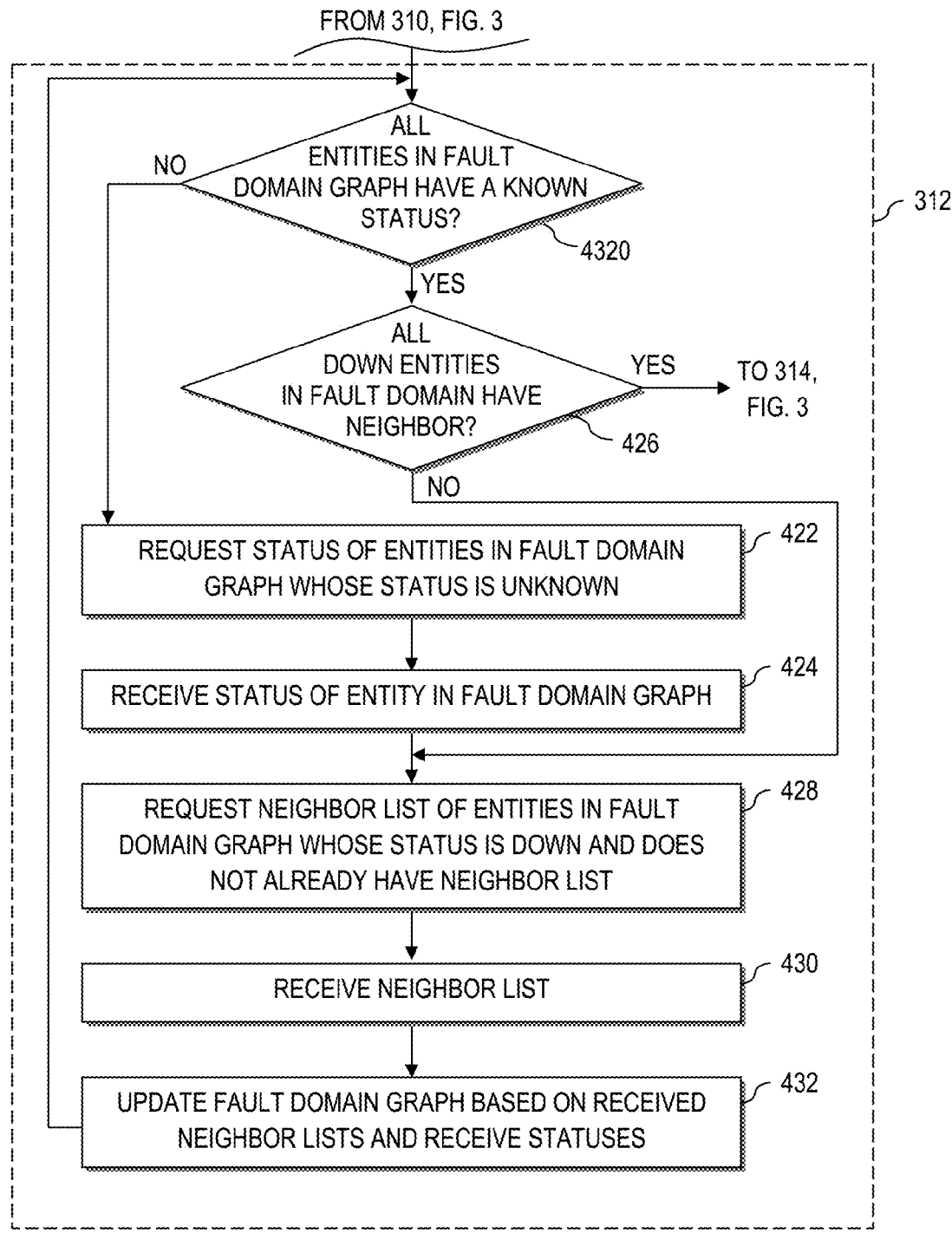
FIG. 4 is a flow chart illustrating a method to complete a fault domain created by the method of FIG. 3, according to various aspects of the present disclosure.

At 312, the fault isolation system completes the fault domain graph, which is described in greater detail in reference to FIG. 4. At 420, the fault isolation system determines if all the entities in the fault domain graph have a known status (either up or down). If any of the entities have an unknown status, then the fault isolation system requests the statuses of the entities in the fault domain with an unknown status at 422, and then at 424, the fault isolation system receives the statuses for the entities in the fault domain with an unknown status. The statuses may be received serially or all at one time. Further, it is possible for the neighbor list to also include statuses of the neighboring entities, so a request for the statuses is not required. As mentioned above, when the statuses for the neighboring entities are received, the state machine transitions to statusWaiting and requests neighbor lists for entities that have a down status (422). The state machine then transitions back to the neighborWaiting state. Thus, the fault domain graph may be completed.

However, if all of the entities in the fault domain include a known status, then the fault isolation system determines if any of the down entities in the fault domain do not have an associated neighbor list at 426 (a neighbor list is not requested for entities with an up status). If there are any down entities in the fault domain without a received neighbor list, then the fault isolation system proceeds to 428 and requests neighbor lists for entities in the fault domain graph for which the fault isolation system has not received a neighbor list. At 430, the fault isolation system receives the neighbor list (e.g., from the network management system), and at 432, the fault isolation system updates the fault domain graph to reflect the received statuses and neighbor lists.

If, at 426, all of the entities in the fault domain graph include a known status and all neighbor lists for the down entities in the fault domain graph have been received, then the fault isolation system returns to FIG. 3.

At 314, the fault isolation system determines the root cause(s) of the problem with the network. For example, the state machine may transition to the rootCauseDetermination state. If there are no entities with an up status in the fault domain graph, then the fault isolation system cannot perform root cause analysis. However, the fault isolation graph and state machine are kept in case an entity in the fault domain graph recovers from the problem. The same graph can be used in a recovery algorithm. However, if at least one of the entities in the fault domain graph includes an up status, then the fault isolation system may perform a root cause analysis. In a simple case, the root cause is determined to be any entity with a down status that is coupled to (i.e. neighbors with) an entity with an up status. However, there are other methods to determine root causes for complex or multiple root causes.

Figure 5:
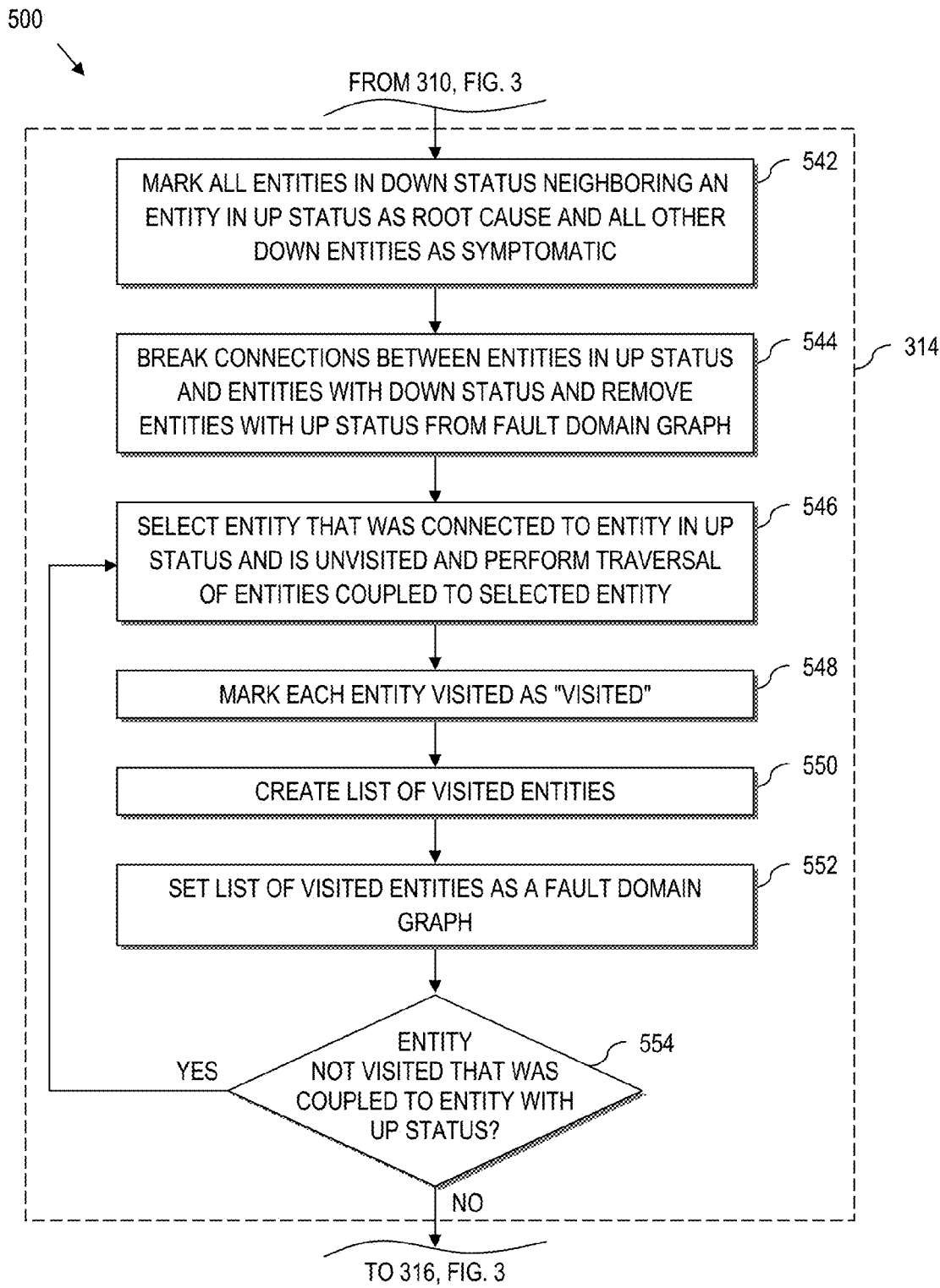
FIG. 5 is a flow chart illustrating a method to determine a root cause of a problem in the network using the fault domain created by the method of FIG. 3, according to various aspects of the present disclosure.

Turning to FIG. 5, a flow chart showing a method 500 for determining a complex or multiple root causes is shown. At 542, all entities with a down status in the fault domain graph that are neighbors with an entity with an up status are marked as a root cause, and the other entities with a down status in the fault domain graph are marked as symptom entities. At 544, the fault isolation system breaks any connection between entities with an up status and their neighbors, and all of the entities with an up status are removed from the fault domain graph (instead of breaking the connections and removing the entities with an up status, those entities can just be marked as visited). The fault isolation system performs a traversal (e.g., a depth-first traversal) starting at a selected entity at 546 (that was connected to an entity in an up status), marks each entity visited as "visited" at 548, and creates a list of all of the visited entities at 550. When there are no more entities to traverse from the starting entity, then the list reflects a first fault domain at 552. If there is an entity that has not been visited but was a neighbor of an entity with an up status, then at 554 the fault isolation system loops back to 546 to select that entity and performs the rest of the method 548, 550, 552 until all of the entities have been visited, creating a new fault domain (i.e., a fault subdomain) graph for each time the method hits 552. When all of the entities left in the fault domain graph are marked as visited, the resulting fault domain graphs are used for the simple root cause analysis listed above.

Another method of performing a complex root cause analysis includes performing a connected component analysis on the fault domain. Basically, a set of entities within the fault domain that have an up status is created. Each entity within the set is then marked as visited. A connected component set is identified for all entities not marked as visited by selecting a neighbor of the set of entities within the fault domain that have an up status and performing a depth-first search on entities not marked as visited. The entities found in that depth-first search are grouped as a fault subdomain. Then, a next unvisited neighbor of the set of entities within the fault domain that have an up status is selected and the process repeats until every entity in the fault domain has been marked as visited. The results of the process create fault subdomains.

Other methods of performing a root cause analysis may be performed.

Referring back to FIG. 3, at 316 the root causes are published to the network management system, so the network management system may initiate the process and corresponding state machines to aid in recovery from the problem. In some cases, when a root cause is fixed, another root cause may be found on another entity downstream from the fixed root cause (i.e., only a partial recovery has taken place). If that is the case, then the method 300 of FIGS. 3-5 may be run again. If there is no change in the topology of the down entities in the fault domain graph (there will be a change in the status of at least one entity from a down status to an up status, which is not a topology change), then the root cause analysis is performed for the fault domain graph. However, if there is a change in the topology of the down entities in the fault domain graph (determined by changed neighbor lists for the down entities), then new statuses are requested and new neighbor lists may be requested (i.e., state machine transitions between statusWaiting and neighborWaiting states). Once all the statuses are known and the neighbors are known, then a root cause analysis is performed (i.e., state machine transitions to the rootCauseDetermination state).

At any time, the fault isolation system may receive a notification that another entity is in a down state. If that is the case, then the fault isolation system will start a new fault domain graph for the new entity in a down state (including a new state machine for the fault domain graph, if the state machines are used). However, the fault isolation system will try to merge separate fault domain graphs into one single fault domain graph if possible by matching entities between the separate domains, as discussed above in reference to FIG. 2.

Note that the flow charts of FIGS. 3-5 include serial processing, but some of the processing may be performed in parallel. For example, requests for neighbor lists and for entity statuses may be performed concurrently, and the received neighbor lists may include statuses (or the statuses may be received separately regardless if the requests are sent concurrently). The requests and updating the fault domain basically continues until all of the statuses for each entity in the fault domain and all neighbor lists have been received. Thus, the method 300 can handle asynchronous status and neighbor list responses.

The methods described above can be used to handle problems that may have multiple root causes by asynchronously building one or more fault domains within a fault domain graph. If the root cause is fixed, and the problem still exists in other entities of the fault domain graph, then the method may be used to find a new root cause using recovery state transition logic of a state machine. When a recovery occurs, the fault isolation system uses the current fault domain graph and moves the state machine to a Recovery state. In the Recovery state, the fault isolation system requests neighbor lists of all entities with a down status in the fault domain graph and updates the fault domain graph if necessary. Further, the fault isolation system requests the status of all entities in fault domain graph. On receiving the statuses, if every status is up, everything is good, and the fault isolation system removes the fault domain graph. If some statuses are down and topology has not changed, then root cause analysis is performed (i.e. the state machine moves to the rootCauseDetermination state to continue with identifying new root causes and their associated symptoms). If new entities are added to the topology, the statuses of newly added entities are requested and the state machine transitions to the statusWaiting state to continue with fault isolation. The asynchronous nature of the method decouples the fault isolation system from other areas of the fault management system. Thus, the fault isolation system does not need to know the topology of the network discovered by the fault management system. Instead the network topology of entities in a down status is built on-the-fly.

The network management system can be a distributed system. Thus, the distributed systems may monitor different segments of the network, which may not respond to the neighbor request immediately, because that particular system may need to contact other systems for the neighbor lists. The fault isolation system discussed herein is asynchronous in nature, so the fault isolation system does not need to stop and will continue processing other notifications while waiting for statuses and neighbor lists. As such, fault isolation is removed from the network management system (which is synchronous) to a fault isolation system (which is asynchronous) that may be implemented as a stand-alone product, a plug-in for an existing network management system, or integrated as part of the network management system (although if integrated, the fault isolation system will still run asynchronously).

Example of Building a Fault Domain Graph and Simple Root Cause Analysis

Figure 6:
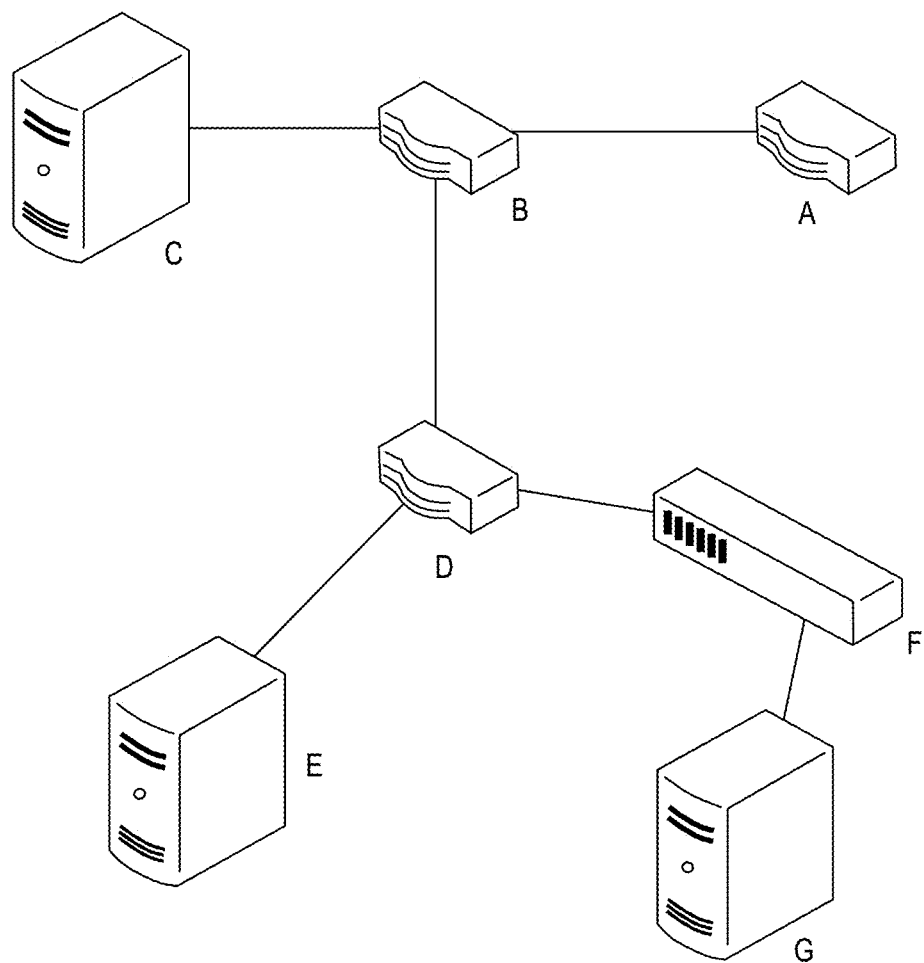
FIG. 6 is a sample network used in an example of building a fault domain and a simple root cause analysis, according to various aspects of the present disclosure.

FIG. 6 is a diagram illustrating an example network 600. Entity_A is coupled to entity B, which is coupled to entity C and entity D. Entity D is coupled to entity E and entity F, which is coupled to entity G. A network management system that manages the network 600 includes a fault isolation system that instantiates the state machine of FIG. 2 and uses the methods of FIGS. 3-5.

In an example of the state machine and method, the fault isolation system receives a notification that entity F is down. Thus, the fault isolation system checks to see if entity F is associated with any other fault domain graph. In this case, there are no other fault domain graphs created, so the fault isolation system creates a first fault domain graph and instantiates a first state machine associated with the first fault domain graph, as shown in FIG. 7. Thus, the first fault domain graph only includes one entity, F, with a known status of down. The first state machine transitions from an initial state to a statusWaiting state, and the fault isolation system sends a request for a neighbor list for entity F. Then, the first state machine transitions to the neighborWaiting state.

The fault isolation system receives another notification and determines that the new notification is not the requested neighbor list. Instead, the new notification is a notification that entity E is down. Thus, the fault isolation system checks the first fault domain graph for E and does not find entity E. Therefore, the fault isolation system creates a second fault domain graph for entity E and instantiates a second state machine. Thus, the second fault domain graph only includes one entity, E, with a known status of down (as shown in FIG. 8). The second state machine transitions from an initial state to a statusWaiting state, and the fault isolation system sends a request for a neighbor list for entity E. Then, the second state machine transitions to the neighborWaiting state.

While the fault isolation system is waiting for neighbor lists for both fault domain graphs, another notification of a down entity (entity C) is received. The fault isolation system determines that entity C is not in either fault domain graph, so the fault isolation system instantiates a third state machine and creates a third fault domain graph. Thus, the third fault domain graph only includes one entity, C, with a known status of down (as shown in FIG. 9). The third state machine transitions from an initial state to a statusWaiting state, and the fault isolation system sends a request for a neighbor list for entity C. Then, the third state machine transitions to the neighborWaiting state.

The fault isolation system receives a new notification, which turns out to be the neighbor list for entity F, which indicates that the neighbors of entity F are entity D and entity G. The fault isolation system adds the neighbors to the first fault isolation system with unknown statuses for entities D and G, as shown in FIG. 10, Further, the fault isolation system requests status updates for entities D and G, and the first state machine transitions to the statusWaiting state.

The fault isolation system receives another notification, which indicates that entity D is down. Thus, the fault isolation system finds entity D in the first fault domain graph and updates the status of entity D, as shown in FIG. 11. Then, the neighbors for entity D are requested, and the first state machine transitions to the neighborsWaiting state.

Figure 12:
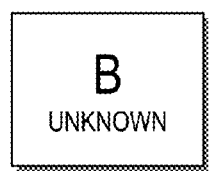

The fault isolation system receives a notification that entity B is down, so the fault isolation system checks the existing fault domain graphs for entity B but does not find entity B. Therefore, the fault isolation system creates a fourth fault domain graph for entity B and instantiates a fourth state machine. Thus, the fourth domain graph only includes one entity, B, with a known status of down (as shown in FIG. 12). The fourth state machine transitions from an initial state to a statusWaiting state, and the fault isolation system sends a request for a neighbor list for entity B. Then, the fourth state machine transitions to the neighborWaiting state.

Figure 13:
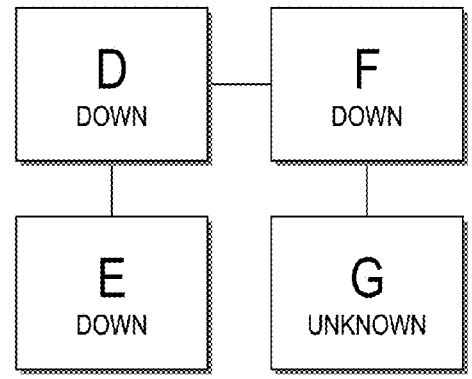

The fault isolation system receives a notification that indicates that entity E has one neighbor, entity D. Entity D is already part of the first fault domain graph and entity E is part of the second fault domain graph, so the fault isolation system merges the second fault domain graph into the first fault domain graph, as shown in FIG. 13. Further, the second state machine is merged in with the first state machine. The statuses of entities D, E, and F are known and a request has already been sent for the status of entity G, so the first state machine (merged with the second state machine) remains in the statusWaiting state.

Figure 14:
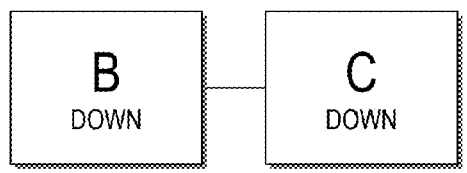

The fault isolation system receives a notification that entity C has only one neighbor: entity B, which is included in the fourth fault domain graph. Therefore, the fault isolation system merges the fourth fault domain graph with the third fault domain graph, as shown in FIG. 14, and merges the fourth state machine with the third state machine, which remains in the neighborWaiting state. At this point, there are two fault domain graphs (the merged first and second graph and the merged third and fourth graph) and two state machines.

Figure 15:
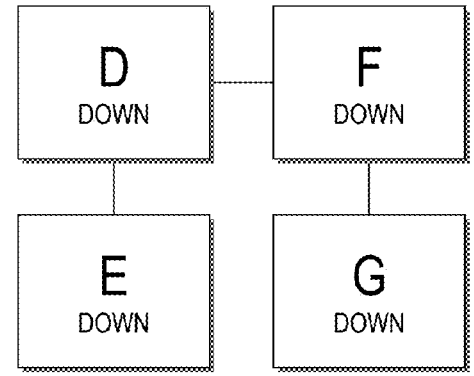

The fault isolation system receives another notification, which indicates that the status of entity G is down, so the fault isolation system updates the merged first and second fault domain graphs to indicate that entity G is down, as shown in FIG. 15. Further, the fault isolation system requests neighbors for entity G and the merged first and second state machine transitions to the neighborWaiting state. The neighbor list for G is received and indicates that G has only one neighbor, entity F, which is already reflected in the merged first and second fault domain graphs.

Figure 16:
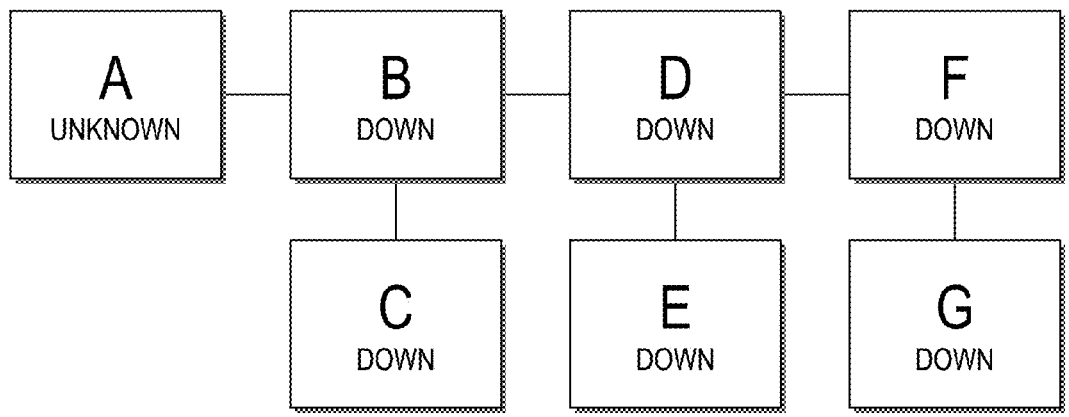

The fault isolation system receives a notification that entity B has neighbors in entities A, C, and D. Entity D is already known to be in the merged first and second fault domain graphs, so the two existing fault domain graphs are merged into one fault domain graph, as shown in FIG. 16. The state machines are merged, a request for a status of entity A is requested, and the merged state machine transitions to the statusWaiting state.

Figure 17:
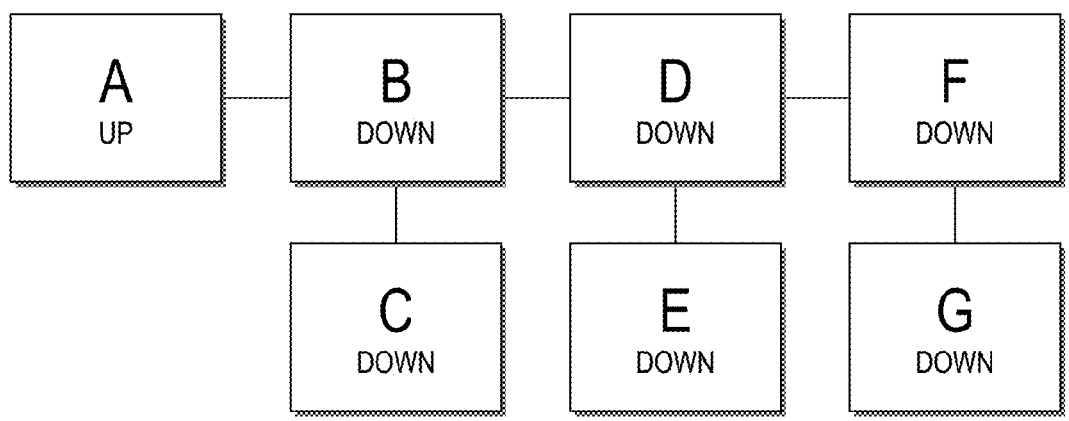

The fault isolation system receives a notification that entity A is up, so the fault isolation system updates the merged fault domain graph, as shown in FIG. 17. Because entity A is up, no request is sent for a neighbor list of entity A. At this point, all of the entities in the fault domain graph have a known status and all of the entities with a down status have known neighbors, so the state machine transitions to the rootCauseDetermination state to determine the root cause of the problem. In this case, entity A (the entity in an up state) has only one neighbor, so entity B is determined to be the root cause and entities C, D, E, F, and G are marked as symptomatic entities. The state machine transitions to the Publish state, and the results that entity B is the root cause and entities C, D, E, F, and G are symptomatic entities are published. Therefore, a system administrator knows to focus attention on entity B to resolve the problem.

Thus, four asynchronously built fault domain graphs were merged into one fault domain graph.

First Example of a Complex Root Cause Analysis

Figure 18:
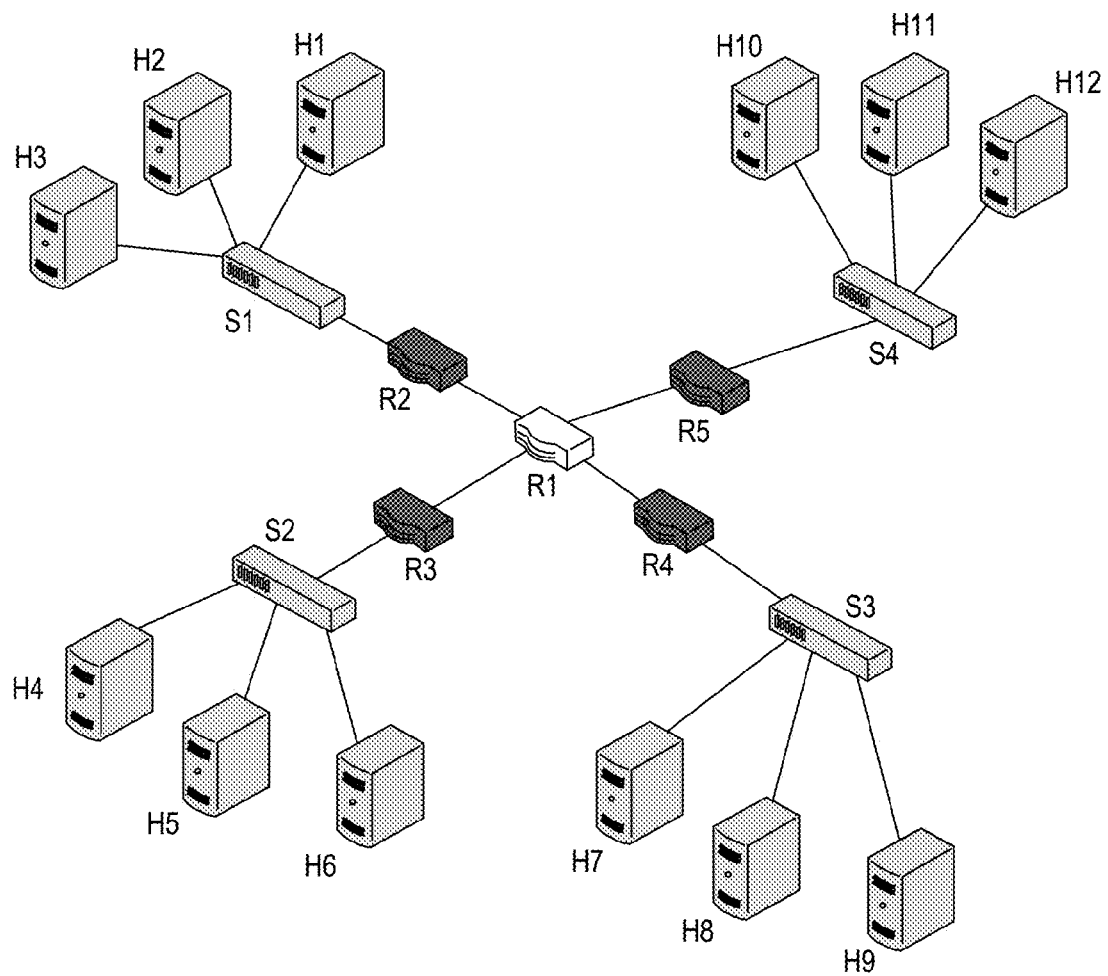
FIGS. 18-19 illustrate a sample network used in an example of a complex root cause analysis, according to various aspects of the present disclosure.
Figure 19:
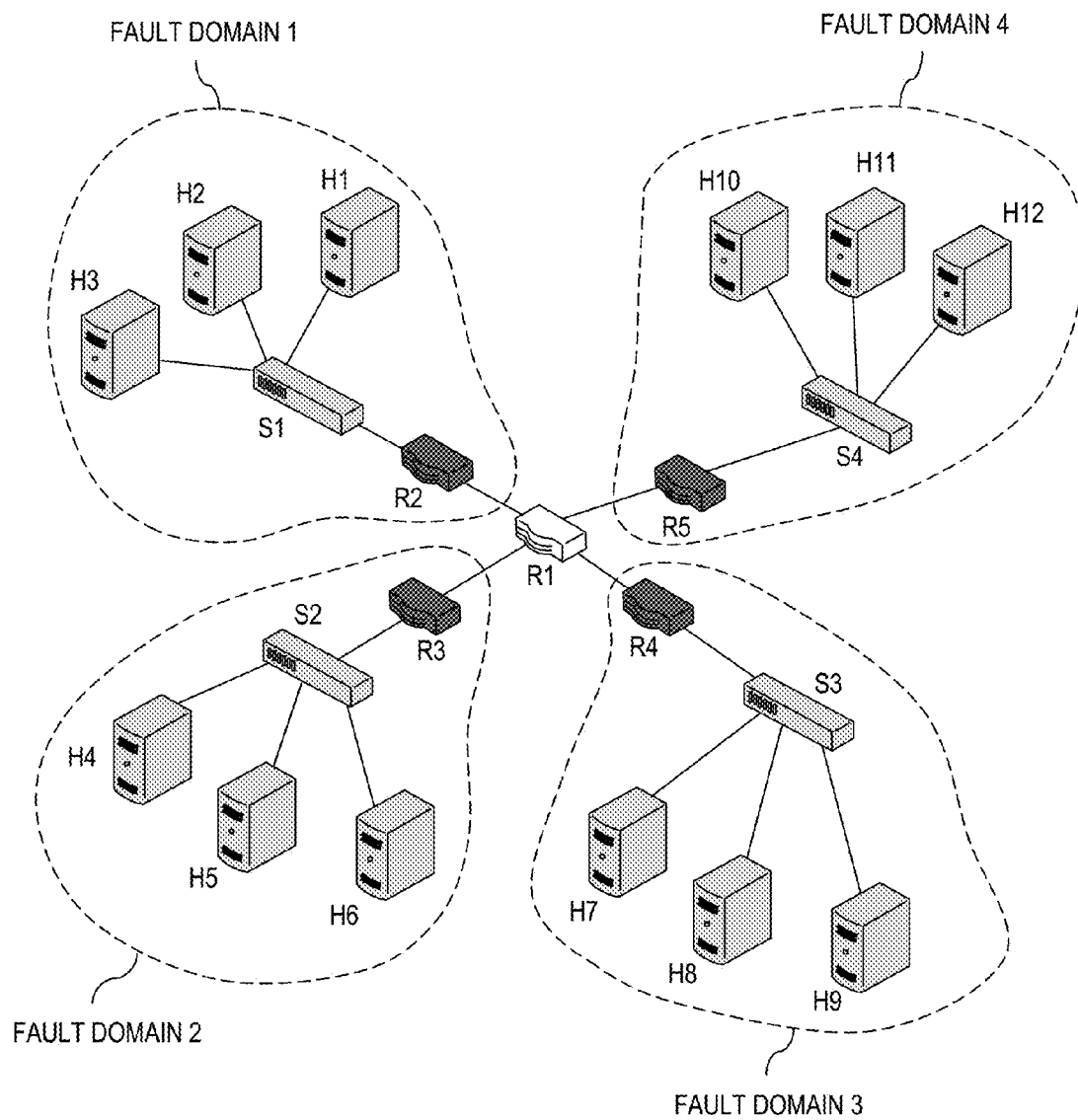

FIG. 18 illustrates a sample fault domain graph created after several notifications are received by the fault isolation system. There are four root causes (R2, R3, R4, and R5), so a more complex root cause analysis should be performed (e.g., the root cause analysis of FIG. 5). The entities marked as root causes have their links broken to the entity with an up status (i.e., R1). R2 is selected and the fault domain graph is traversed to S1, H1, H2, and H3. There are no more entities connected to any of the entities found, so R2, S1, H1, H2, and H3 are grouped together as a first fault domain. This process is repeated for each of the root cause entities (R3, R4, and R5), and three more fault domains are found, as shown in FIG. 19. Thus, a fix of R3 will not affect anything in the fault domain including R2.

A system administrator fixes R2, R3, R4, and R5, and most of the network is back in an up status. However, S4 still has a down status. Therefore, the fault isolation system requests neighbor lists for the entities with a down status (i.e., S4, H10, H11, and H12). In this case, the neighbor lists are received and indicate that no change has been made to the topology of the fault domain graph. Thus, a simple root cause analysis is performed, and S4 is labeled a root cause while H10-12 are designated as symptomatic entities. Therefore, the network administrator remedies the issue at S4, and the rest of the network is in an up status.

Second Example of a Complex Root Cause Analysis

Figure 20:
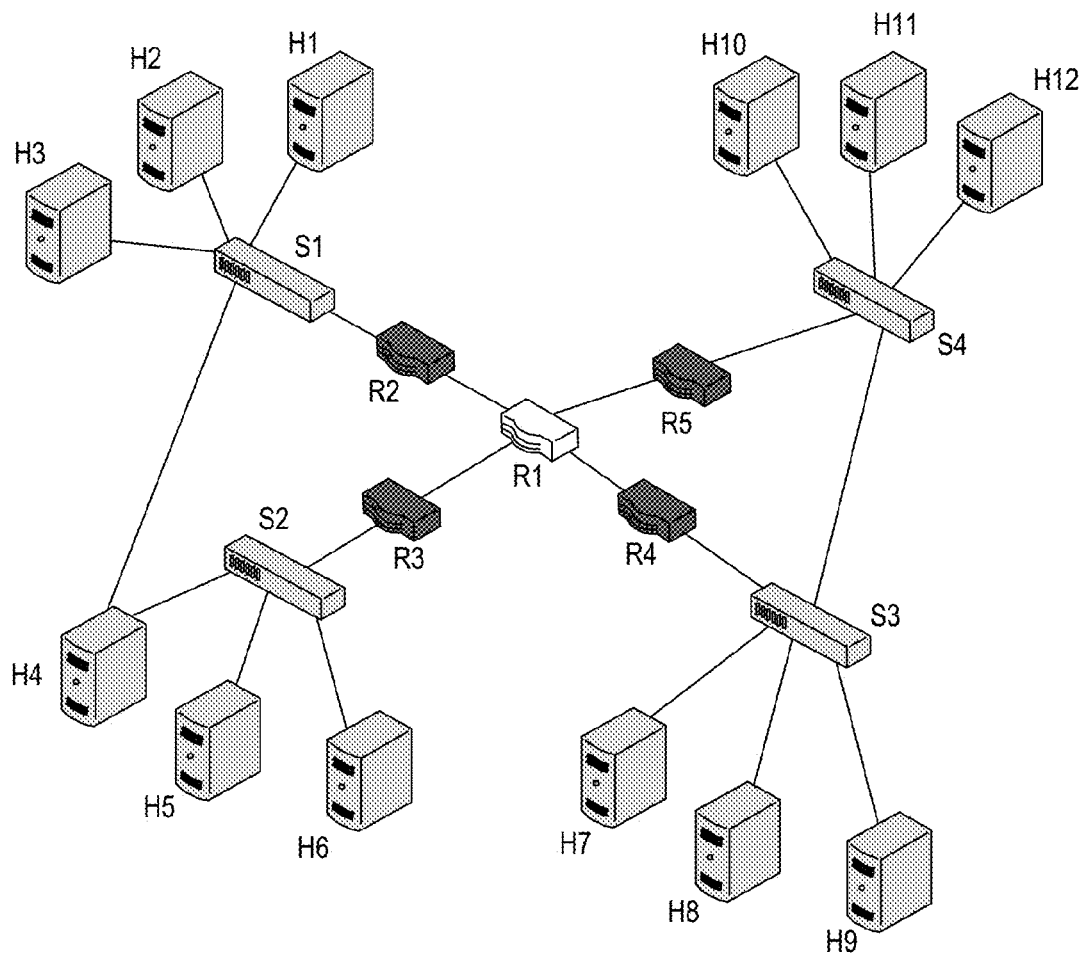
FIGS. 20-22 illustrate a sample network used in a second example of a complex root cause analysis, according to various aspects of the present disclosure.
Figure 21:
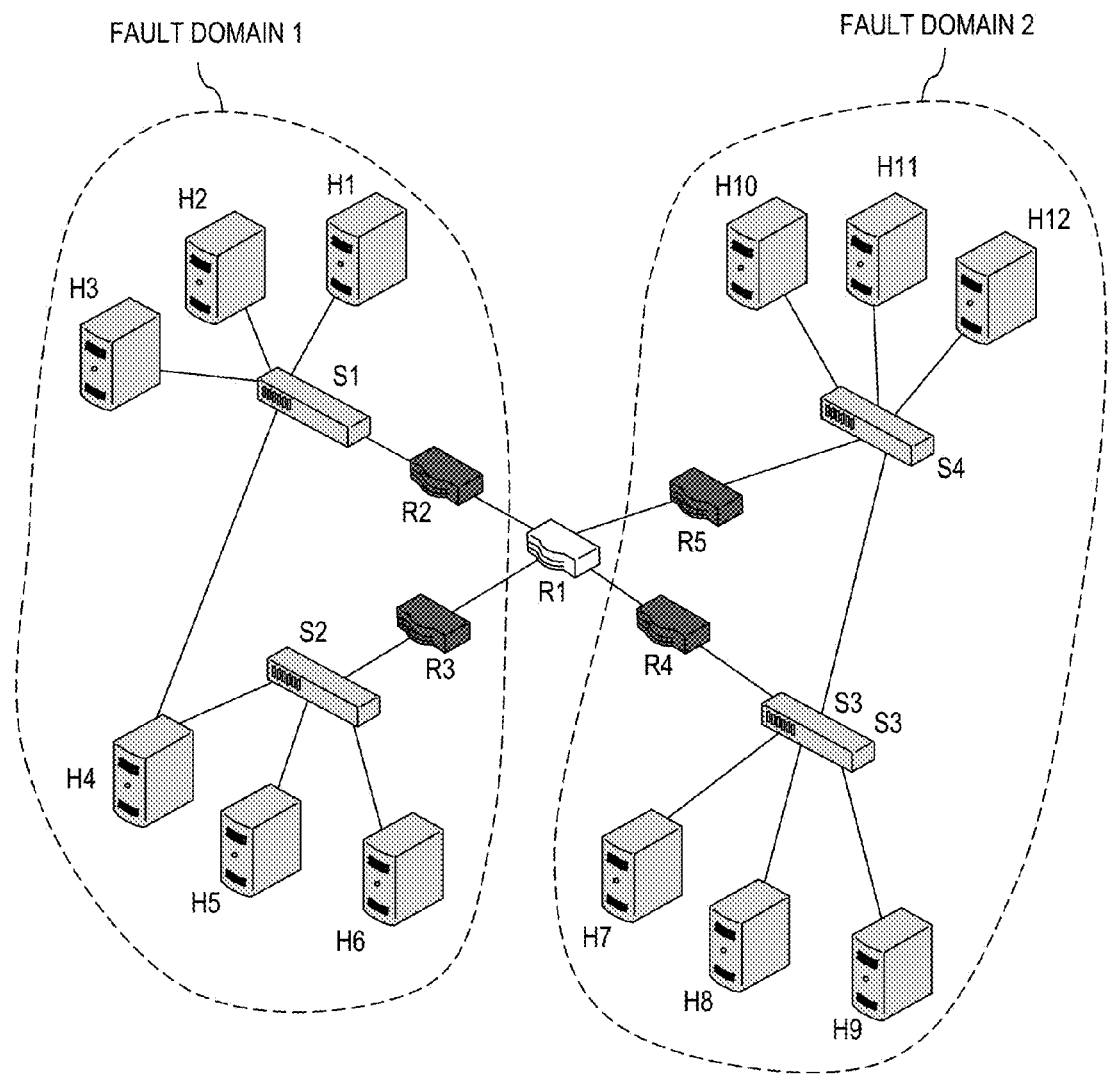

FIG. 20 illustrates a second sample fault domain graph created after several notifications are received by the fault isolation system, which is similar to the fault domain graph of FIG. 18, except there is also a link between H4 and S1 and another link between S3 and S4. There are four root causes (R2, R3, R4, and R5), so a more complex root cause analysis should be performed (e.g., the root cause analysis of FIG. 5). The entities marked as root causes have their links broken to the entity with an up status (i.e., R1). R2 is selected and the fault domain graph is traversed to S1, H1, H2, and H3; further, S1 is coupled to H4, so S2, H5, H6, and R3 are included in a first fault domain. This process is repeated for R4, which includes a fault domain of S1, H7, H8, H9, S4, H10, H11, and H12. Thus there are two fault domains, as shown in FIG. 21. Thus, a fix of R4 will not affect anything in the fault domain including R2.

Figure 22:
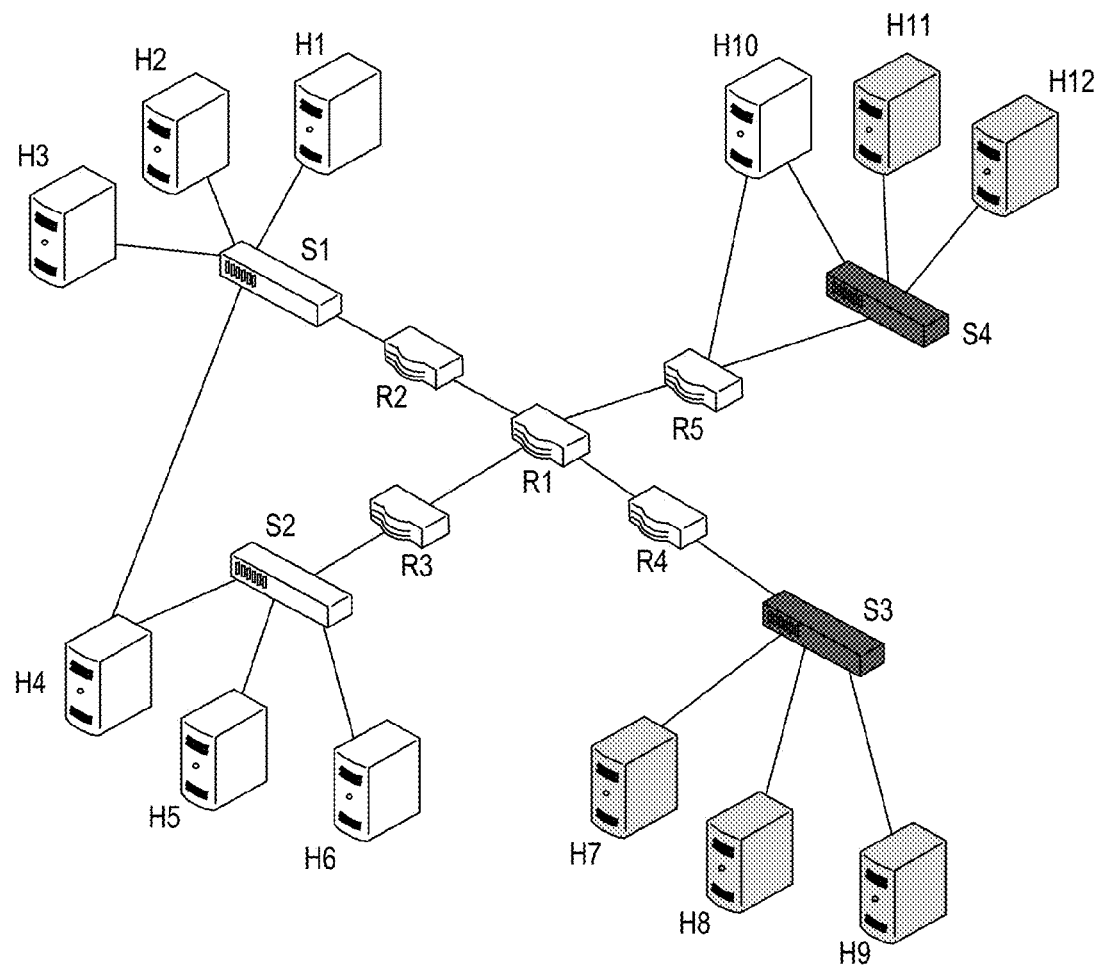

A system administrator fixes R2, R3, R4, and R5, and the network looks like FIG. 22. Thus, the entire first fault domain has been fixed. However, there is still a problem with the second fault domain: S3 and S4 are still down along with H7, H8, H9, H11, and H12. Therefore the fault isolation system requests neighbor lists for S3, S4, H7, H8, H9, H11, and H12, which are received by the fault isolation system. Using the neighbor lists, the fault isolation system identifies that the link between S3 and S4 is broken, and a new link between R5 and H10 has been added. Thus, the fault isolation system amends the fault domain graph, which results in FIG. 22. After a root cause analysis, S3 and S4 are defined as root causes, and the system administrator fixes the root causes, which results in the entire network in an up status.

Data Processing System

Figure 23:
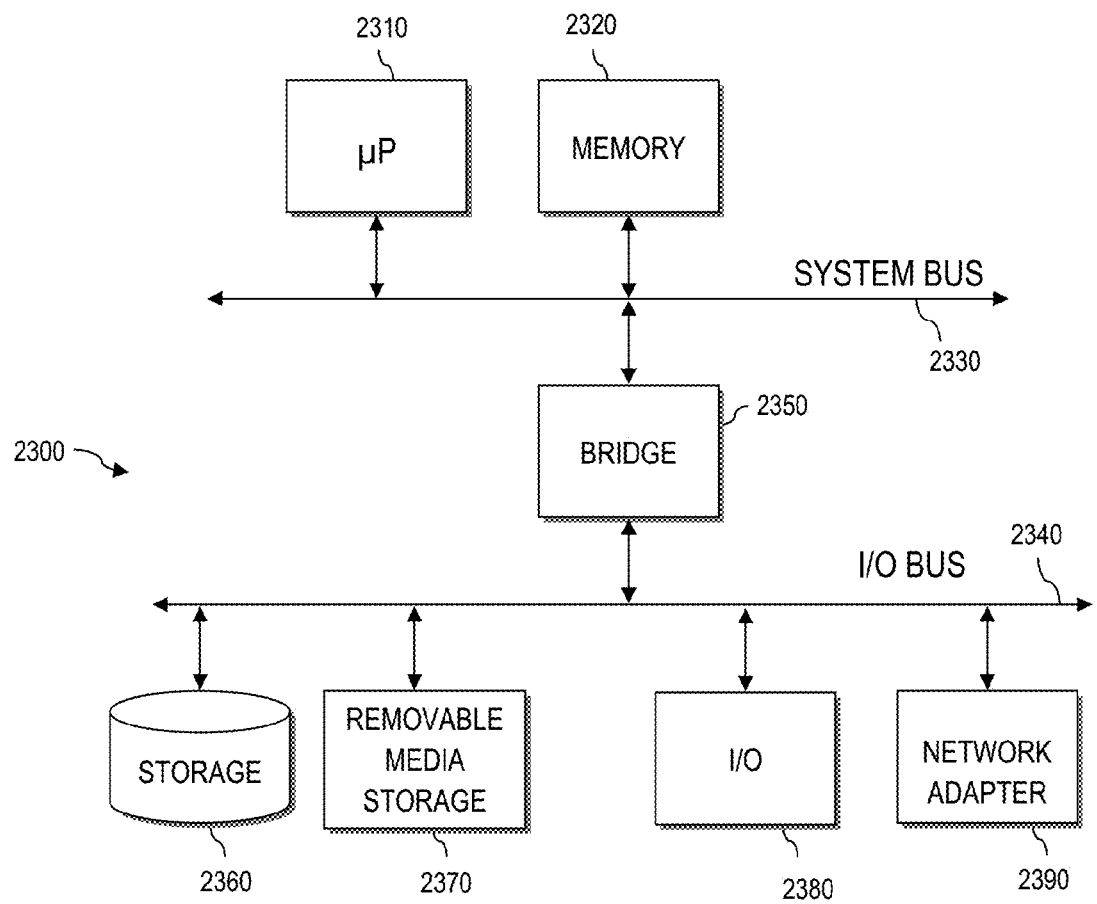
FIG. 23 is a block diagram of a computer system having a computer readable storage medium for implementing functions according to various aspects of the present disclosure as described in greater detail herein.

Referring to FIG. 23, a block diagram of a data processing system is depicted in accordance with the present invention. Data processing system 800 may comprise a symmetric multiprocessor (SMP) system or other configuration including a plurality of processors 810 connected to system bus 820. Alternatively, a single processor 810 may be employed. Also connected to system bus 820 is memory controller/cache 830, which provides an interface to local memory 840. An I/O bus bridge 850 is connected to the system bus 820 and provides an interface to an I/O bus 860. The I/O bus may be utilized to support one or more buses and corresponding devices 870, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 880, storage 890 and a computer usable storage medium 895 having computer usable program code embodied thereon. The computer usable program code may be executed to implement any aspect of the present invention, for example, to implement any aspect of any of the methods and/or system components illustrated in the figures.

The data processing system depicted in FIG. 8 may comprise, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving an electronic notification that an entity of a computer network includes a down status, wherein the notification signifies a problem with the network;
   creating a fault domain graph including the entity with the down status;
   receiving a neighbor list for the entity with the down status, wherein the neighbor list includes names of entities that are connected to the entity with the down status;
   updating the fault domain graph based on the received neighbor list by adding entities included in the neighbor list to the fault domain graph, wherein each of the added entities includes an unknown status;
   repeating the following actions iteratively, until all entities in the fault domain graph include a known status that includes an up status or the down status, neighbor lists have been received for all entities with the down status within the fault domain graph, and the fault domain graph has been updated with the entities from the neighbor lists:
      receiving the up status or the down status for each entity that has the unknown status in the fault domain graph at a present iteration;
      updating the fault domain graph based on the received statuses received at the present iteration;
      receiving the neighbor list for each entity in the fault domain graph with the down status at the present iteration and whose neighbor list has not already been received; and
      updating the fault domain graph based on the received neighbor lists by adding entities included in the neighbor lists and not already included in the fault domain graph to the fault domain graph, wherein each of the added entities includes the unknown status;
   determining, by a hardware processor, a root cause of the problem of the network based on the fault domain graph; and
   publishing the root cause.

2. The method of claim 1, wherein determining, by a hardware processor, a root cause of the problem of the network based on the fault domain graph further comprises:
   identifying a select entity in the fault domain graph with the up status;
   classifying each entity that is a neighbor of the select entity in the fault domain graph with the up status as the root cause; and classifying all other entities with the down status in the fault domain graph as symptomatic entities.

3. The method of claim 2 further comprising:
breaking a link between the select entity with the up status in the fault domain graph and any entities that are neighbors to the select entity with the up status of the fault domain graph;
removing the select entity with the up status of the fault domain graph from the fault domain graph;
selecting a first neighbor of the removed select entity with the up status;
repeating until all of the neighbors of the removed select entity with the up status have been traversed:
traversing, depth first, the selected neighbor and entities that are neighbors to the selected neighbor until all entities coupled to the selected neighbor are traversed and marking each entity traversed as part of a fault subdomain associated with the selected neighbor; and
selecting a next untraversed neighbor of the removed select entity with the up status.

4. The method of claim 2 further comprising:
creating a set of entities with the up status;
marking each entity in the set of entities with the up status as visited; and
repeating the following actions until all neighbors of the set of entities with the up status have been traversed:
identifying a connected component set for entities not marked as visited by performing a depth-first-search from an entity not marked as visited;
marking all the entities in the connected component set as visited; and
creating a fault subdomain by grouping each entity in the connected component set as the fault subdomain.

5. The method of claim 1, wherein:
receiving the electronic notification further comprises receiving the notification from a network management system that manages the network;
receiving the neighbor list further comprises receiving the neighbor list from the network management system; and
publishing the root cause further comprises publishing the root cause to the network management system.

6. The method of claim 1, wherein:
creating the fault domain graph including the entity with the down status further comprises instantiating a state machine for the fault domain graph, wherein:
the state machine transitions to a first state;
the neighbor list for the entity with the down status is requested; and
the state machine transitions to a second state after the neighbor list for the entity with the down status is requested;
repeating the following actions until all entities in the fault domain graph include a known status and neighbor lists have been received for all entities with the down status within the fault domain graph further comprises:
requesting a status of entities of the fault domain graph whose statuses are unknown;
transitioning the state machine from the second state to the first state in response to requesting the status of entities of the fault domain graph whose statuses are unknown;
transitioning the state machine to the first state in response to receiving the status of an entity in the fault domain graph;
requesting a neighbor list for each entity in the fault domain graph that includes the down status and does not already have the neighbor list;
transitioning the state machine to the second state in response to requesting the neighbor list for each entity in the fault domain graph that includes the down status and does not already have the neighbor list; and
transitioning the state machine to a third state in response to all entities in the fault domain graph having a known status and receiving neighbor lists for all entities with the down status within the fault domain graph;
determining, by a hardware processor and based on the fault domain graph, a root cause of the problem of the network further comprises determining, by the hardware processor, symptomatic entities associated with the root cause; and
publishing the root cause further comprises:
transitioning the state machine to a fourth state; and
publishing the symptomatic entities associated with the root cause.

7. The method of claim 1, wherein creating a fault domain graph further comprises creating the fault domain graph separate from a topology of the network stored by a network management system.

8. The method of claim 1 further comprising:
receiving a subsequent notification that a subsequent entity of the network includes the down status, wherein the subsequent entity is not part of the fault domain graph;
creating a subsequent fault domain graph including the subsequent entity with the down status;
determining whether the subsequent fault domain graph may be merged with the fault domain graph; and
updating the fault domain graph by merging in the subsequent fault domain graph with the fault domain graph if the subsequent fault domain graph may be merged.

9. The method of claim 8, wherein:
determining, based on the fault domain graph, a root cause of the problem of the network further comprises determining, based on the subsequent fault domain graph, a subsequent root cause of the network if the subsequent fault domain graph cannot be merged with the fault domain graph; and
publishing the root cause further comprises publishing the subsequent root cause if the subsequent fault domain graph cannot be merged with the fault domain graph.

10. The method of claim 9 further comprising:
repeating, if the subsequent fault domain graph cannot be merged with the fault domain graph, until all entities in the subsequent fault domain graph include a known status and neighbors are known for all entities with the down status in the subsequent fault domain graph:
requesting a status of entities of the subsequent fault domain graph whose statuses are unknown;
receiving the status of each entity in the subsequent fault domain graph;
requesting a neighbor list for each entity in the subsequent fault domain graph that includes the down status and does not already have a neighbor list;
receiving the neighbor lists; and
updating the subsequent fault domain graph based on the received neighbor lists.

11. A system comprising a hardware processor coupled to memory, wherein the processor is programmed to determine a root cause of a problem in a network by:

receiving an electronic notification that an entity of a computer network includes a down status, wherein the notification signifies a problem with the network;

creating a fault domain graph including the entity with the down status;

receiving a neighbor list for the entity with the down status, wherein the neighbor list includes names of entities that are connected to the entity with the down status;

updating the fault domain graph based on the received neighbor list by adding entities included in the neighbor list to the fault domain graph, wherein each of the added entities includes an unknown status;

repeating the following actions iteratively, until all entities in the fault domain graph include a known status that includes an up status or the down status, neighbor lists have been received for all entities with the down status within the fault domain graph, and the fault domain graph has been updated with the entities from the neighbor lists:

receiving the up status or the down status for each entity that has the unknown status in the fault domain graph at a present iteration;

updating the fault domain graph based on the received statuses received at the present iteration;

receiving the neighbor list for each entity in the fault domain graph with the down status at the present iteration and whose neighbor list has not already been received; and updating the fault domain graph based on the received neighbor lists by adding entities included in the neighbor lists and not already included in the fault domain graph to the fault domain graph, wherein each of the added entities includes the unknown status;

determining, by a hardware processor, a root cause of the problem of the network based on the fault domain graph; and publishing the root cause.

12. The system of claim 11, wherein determining, based on the fault domain graph, a root cause of the problem of the network further includes:

identifying a select entity in the fault domain graph with the up status;

classifying each entity that is a neighbor of the select entity in the fault domain graph with the up status as the root cause; and classifying all other entities with the down status in the fault domain graph as symptomatic entities.

13. The system of claim 12, wherein the processor is further programmed to determine a root cause of a problem in a network by:

breaking a link between the select entity with the up status in the fault domain graph and any entities that are neighbors to the select entity with the up status of the fault domain graph;

removing the select entity with the up status of the fault domain graph from the fault domain graph;

selecting a first neighbor of the removed select entity with the up status;

repeating until all of the neighbors of the removed select entity with the up status have been traversed:

traversing, depth first, the selected neighbor and entities that are neighbors to the selected neighbor until all entities coupled to the selected neighbor are traversed and marking each entity traversed as part of a fault subdomain associated with the selected neighbor; and selecting a next untraversed neighbor of the removed select entity with the up status.

14. The system of claim 12, wherein the processor is further programmed to determine a root cause of a problem in a network by:

creating a set of entities with the up status;

marking each entity in the set of entities with the up status as visited; and repeating the following actions until all neighbors of the set of entities with the up status have been traversed:

identifying a connected component set for entities not marked as visited by performing a depth-first-search from an entity not marked as visited;

marking all the entities in the connected component set as visited; and creating a fault subdomain by grouping each entity in the connected component set as the fault subdomain.

15. The system of claim 11, wherein:

receiving the electronic notification further comprises receiving the notification from a network management system that manages the network;

receiving the neighbor list further comprises receiving the neighbor list from the network management system; and publishing the root cause further comprises publishing the root cause to the network management system.

16. The system of claim 11, wherein:

creating the fault domain graph including the entity with the down status further comprises instantiating a state machine for the fault domain graph, wherein:

the state machine transitions to a first state;

the neighbor list for the entity with the down status is requested; and the state machine transitions to a second state after the neighbor list for the entity with the down status is requested;

repeating the following actions until all entities in the fault domain graph include a known status and neighbor lists have been received for all entities with the down status within the fault domain graph further comprises:

requesting a status of entities of the fault domain graph whose statuses are unknown;

transitioning the state machine from the second state to the first state in response to requesting the status of entities of the fault domain graph whose statuses are unknown;

transitioning the state machine to the first state in response to receiving the status of an entity in the fault domain graph;

requesting a neighbor list for each entity in the fault domain graph that includes the down status and does not already have the neighbor list;

transitioning the state machine to the second state in response to requesting the neighbor list for each entity in the fault domain graph that includes the down status and does not already have the neighbor list; and transitioning the state machine to a third state in response to all entities in the fault domain graph having a known status and receiving neighbor lists for all entities with the down status within the fault domain graph;

determining, by a hardware processor and based on the fault domain graph, a root cause of the problem of the network further comprises determining, by the hardware processor, symptomatic entities associated with the root cause; and publishing the root cause further comprises:
  transitioning the state machine to a fourth state; and
  publishing the symptomatic entities associated with the root cause.

17. The system of claim 11, wherein creating a fault domain graph further comprises creating the fault domain graph separate from a topology of the network stored by a network management system.

18. The system of claim 11, wherein the processor is further programmed to determine a root cause of a problem in a network by:
  receiving a subsequent notification that a subsequent entity of the network includes the down status, wherein the subsequent entity is not part of the fault domain graph;
  creating a subsequent fault domain graph including the subsequent entity with the down status;
  determining whether the subsequent fault domain graph may be merged with the fault domain graph; and
  updating the fault domain graph by merging in the subsequent fault domain graph with the fault domain graph if the subsequent fault domain graph may be merged.

19. The system of claim 18, wherein:
  determining, based on the fault domain graph, a root cause of the problem of the network further comprises determining, based on the subsequent fault domain graph, a subsequent root cause of the network if the subsequent fault domain graph cannot be merged with the fault domain graph;
  publishing the root cause further comprises publishing the subsequent root cause if the subsequent fault domain graph cannot be merged with the fault domain graph; and
  the processor is further programmed to determine a root cause of a problem in a network by repeating, if the subsequent fault domain graph cannot be merged with the fault domain graph, until all entities in the subsequent fault domain graph include a known status and neighbors are known for all entities with the down status in the subsequent fault domain graph:
    requesting a status of entities of the subsequent fault domain graph whose statuses are unknown;
    receiving the status of each entity in the subsequent fault domain graph;
    requesting a neighbor list for each entity in the subsequent fault domain graph that includes the down status and does not already have a neighbor list;
    receiving the neighbor lists; and
    updating the subsequent fault domain graph based on the received neighbor lists.

20. Computer-readable hardware with program code stored thereon, wherein the program code instructs a hardware processor to perform:
  receiving an electronic notification that an entity of a computer network includes a down status, wherein the notification signifies a problem with the network;
  creating a fault domain graph including the entity with the down status;
  receiving a neighbor list for the entity with the down status, wherein the neighbor list includes names of entities that are connected to the entity with the down status;
  updating the fault domain graph based on the received neighbor list by adding entities included in the neighbor list to the fault domain graph, wherein each of the added entities includes an unknown status;
  repeating the following actions iteratively, until all entities in the fault domain graph include a known status that includes an up status or the down status, neighbor lists have been received for all entities with the down status within the fault domain graph, and the fault domain graph has been updated with the entities from the neighbor lists:
    receiving the up status or the down status for each entity that has the unknown status in the fault domain graph at a present iteration;
    updating the fault domain graph based on the received statuses received at the present iteration;
    receiving the neighbor list for each entity in the fault domain graph with the down status at the present iteration and whose neighbor list has not already been received; and
    updating the fault domain graph based on the received neighbor lists by adding entities included in the neighbor lists and not already included in the fault domain graph to the fault domain graph, wherein each of the added entities includes the unknown status;
  determining, by a hardware processor, a root cause of the problem of the network based on the fault domain graph; and
  publishing the root cause.

* * * * *